United States Patent [19]

Johnson

[11] Patent Number: 5,673,186
[45] Date of Patent: Sep. 30, 1997

[54] APPARATUS FOR PROTECTING MULTIPLE OUTPUT RECTIFIERS IN A CURRENT-FED DC-TO DC CONVERTER

[75] Inventor: Edward D. Johnson, Plano, Tex.

[73] Assignee: DSC Telecom L.P., Plano, Tex.

[21] Appl. No.: 673,010

[22] Filed: Jul. 1, 1996

[51] Int. Cl.⁶ ...................................... H02H 7/125
[52] U.S. Cl. ................................. 363/53; 363/20
[58] Field of Search ................. 363/20, 53; 361/111

[56] References Cited

U.S. PATENT DOCUMENTS

| | | | |
|---|---|---|---|
| 2,969,494 | 1/1961 | Davis | 363/53 |
| 3,213,349 | 10/1965 | Gutzwiller | 321/11 |
| 3,343,066 | 9/1967 | Cribbs | 321/18 |
| 3,376,489 | 4/1968 | Crayton | 363/20 |
| 3,551,781 | 12/1970 | Smith | 321/11 |
| 3,571,660 | 3/1971 | Phillips | 317/16 |
| 3,708,738 | 1/1973 | Crawford et al. | 320/9 |
| 3,931,546 | 1/1976 | Jakobs et al. | 317/16 |
| 4,347,543 | 8/1982 | Frister et al. | 361/91 |
| 4,698,740 | 10/1987 | Rodgers et al. | 363/89 |
| 4,809,150 | 2/1989 | Limuti et al. | 363/21 |
| 4,977,493 | 12/1990 | Smith | 363/126 |
| 5,148,358 | 9/1992 | Estes, Jr. | 363/24 |
| 5,179,508 | 1/1993 | Lange et al. | 363/16 |
| 5,278,748 | 1/1994 | Kitajima | 363/56 |
| 5,351,179 | 9/1994 | Tsai et al. | 363/53 |

*Primary Examiner*—Stuart N. Hecker
*Attorney, Agent, or Firm*—Baker & Botts, L.L.P.

[57] ABSTRACT

A current-fed DC-to-DC converter (10) includes an input choke (20) which reduces current fluctuation in the converter (10). A power transformer (26), which is coupled to the input choke (20), transforms electrical energy at one voltage magnitude into electrical energy at another voltage magnitude. A first output rectifier (32) is coupled to the input choke (20). A second output rectifier (34, 36) is coupled to the power transformer (26). A first isolation diode (38) and a second isolation diode (40, 42) are coupled to the anodes of the first output rectifier (32) and the second output rectifier (34, 36), respectively. A transient voltage suppression element (12) is coupled to the first isolation diode (38) and the second isolation diode (40, 42). The transient voltage suppression element (12) limits the magnitude of voltage transients created by the input choke (20) and the power transformer (26) during operation of the converter (10), thereby preventing damage to the first and second output rectifiers (32, 34, 36).

18 Claims, 2 Drawing Sheets

5,673,186

APPARATUS FOR PROTECTING MULTIPLE OUTPUT RECTIFIERS IN A CURRENT-FED DC-TO DC CONVERTER

TECHNICAL FIELD OF THE INVENTION

This invention relates in general to the field of power converters. More particularly, the present invention relates to an apparatus for protecting multiple output rectifiers in a current-fed DC-to-DC converter.

BACKGROUND OF THE INVENTION

The output rectifiers in a current-fed DC-to-DC power converter can be damaged by voltage transients that are produced when transformers, such as an input choke or power transformer, transition in the power converter. In particular, some voltage transients may reverse bias an output rectifier to such an extent that the rectifier fails or is damaged. For power converters in which leakage inductances associated with the input choke and power transformers are low, resistance-capacitance (R/C) snubbers have previously been used to dissipate power, and thus reduce the magnitude of voltage transients. In a DC-to-DC converter which outputs voltage of a large magnitude (i.e., approximately 200 volts or more), however, it is difficult to construct a low-cost input choke and power transformer with leakage inductance low enough so that a series R/C snubber can be used to protect the output rectifiers. More specifically, for such a converter, the power loss in a dissipation resistor may become excessive resulting in unacceptable converter efficiency. According to another arrangement, a number of transient voltage suppresser diodes can be used to protect the output rectifiers in a converter by connecting a separate transient voltage suppresser diode in parallel with each rectifier. However, because such transient voltage suppresser diodes are relatively expensive, it is not cost effective to protect output rectifiers in this manner.

SUMMARY OF THE INVENTION

In accordance with the present invention, the disadvantages and problems associated with protecting output rectifiers in a current-fed DC-to-DC converter have been substantially reduced or eliminated.

In one aspect of the invention, a circuit is provided for protecting multiple output rectifiers against voltage transients in a current-fed converter. The circuit includes a plurality of isolation diodes. Each isolation diode is coupled to the anode of an output rectifier. Transient voltage suppression means is coupled to the isolation diodes. The transient voltage suppression means limits the magnitude of voltage transients in the converter, thereby protecting the output rectifiers.

In another aspect of the invention, a current-fed DC-to-DC converter having multiple output rectifiers is provided. The converter includes a first isolation diode coupled to the anode of a first output rectifier. A second isolation diode is coupled to the anode of a second output rectifier. A transient voltage suppression element is coupled to the first isolation diode and the second isolation diode. The transient voltage suppression element limits the magnitude of voltage transients in the converter, thereby preventing damage to the first and second output rectifiers.

In yet another aspect of the invention, a current-fed DC-to-DC converter includes an input choke which reduces current fluctuation in the converter. A power transformer, which is coupled to the input choke, transforms electrical energy at one voltage magnitude into electrical energy at another voltage magnitude. A first output rectifier is coupled to the input choke. A second output rectifier is coupled to the power transformer. A first isolation diode and a second isolation diode are coupled to the anodes of the first output rectifier and the second output rectifier, respectively. A transient voltage suppression element is coupled to the first isolation diode and the second isolation diode. The transient voltage suppression element limits the magnitude of voltage transients created by the input choke and the power transformer during operation of the converter, thereby preventing damage to the first and second output rectifiers.

A technical advantage of the present invention includes using a single transient voltage suppression element to protect multiple output rectifiers in a current-fed DC-to-DC converter. The transient voltage suppression element is coupled to multiple isolation diodes, each of which is coupled to the anode of an output rectifier to be protected. The transient voltage suppression element "clamps" the voltage impressed across it to a particular level. Because the magnitude of voltage transients are limited to the value of the "clamped" voltage, the output rectifiers are not harmed or damaged. In addition, because a single transient voltage suppression element is used, the cost of protecting the output rectifiers is minimized.

BRIEF DESCRIPTION OF THE DRAWINGS

For a better understanding of the present invention, reference may be made to the accompanying drawings, in which.

DETAILED DESCRIPTION OF THE INVENTION

Figure 1:
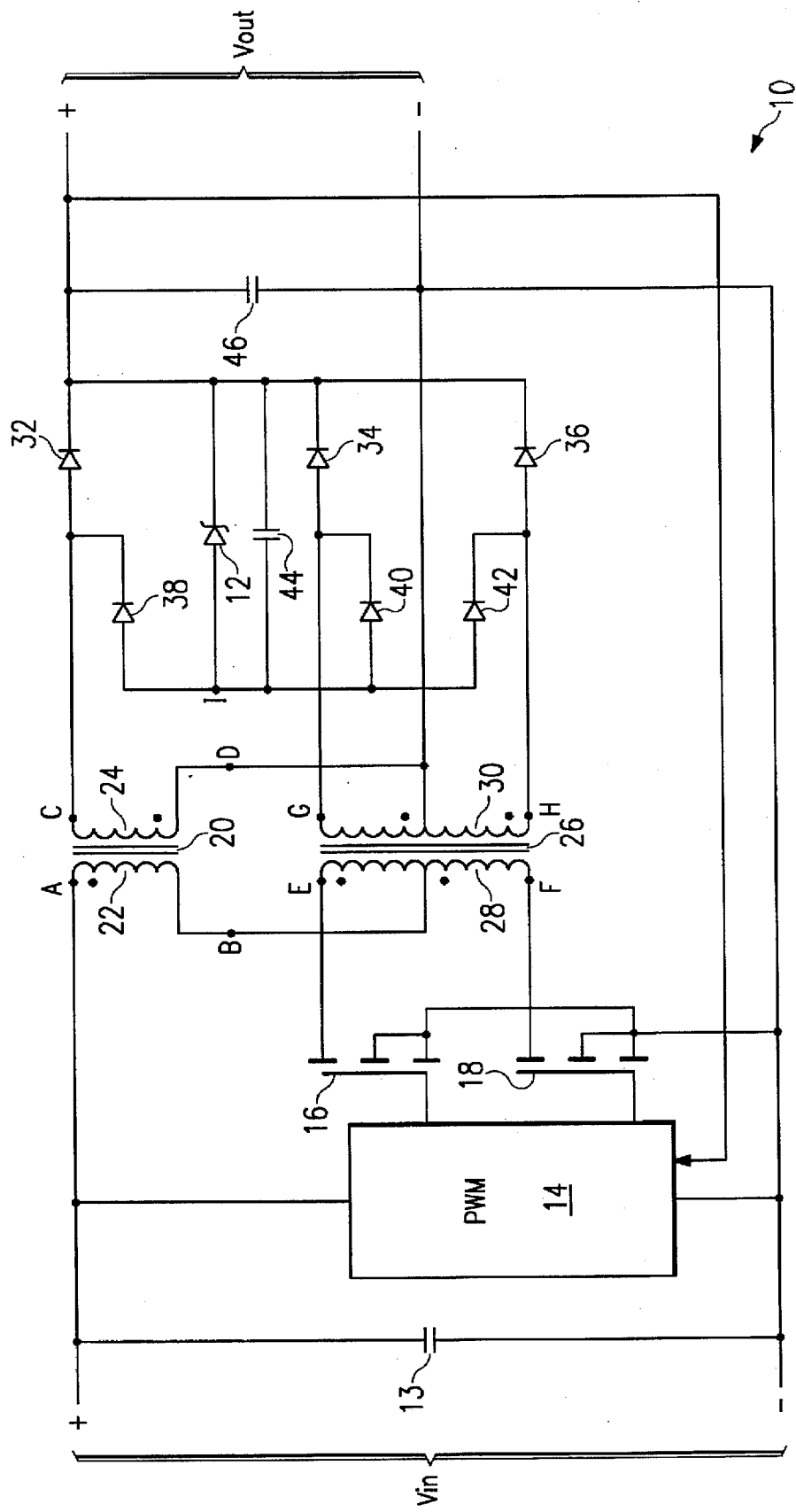
FIG. 1 illustrates a schematic diagram for an exemplary current-fed DC-to-DC power converter having a transient voltage suppression means, according to one embodiment of the invention.
Figure 2A:
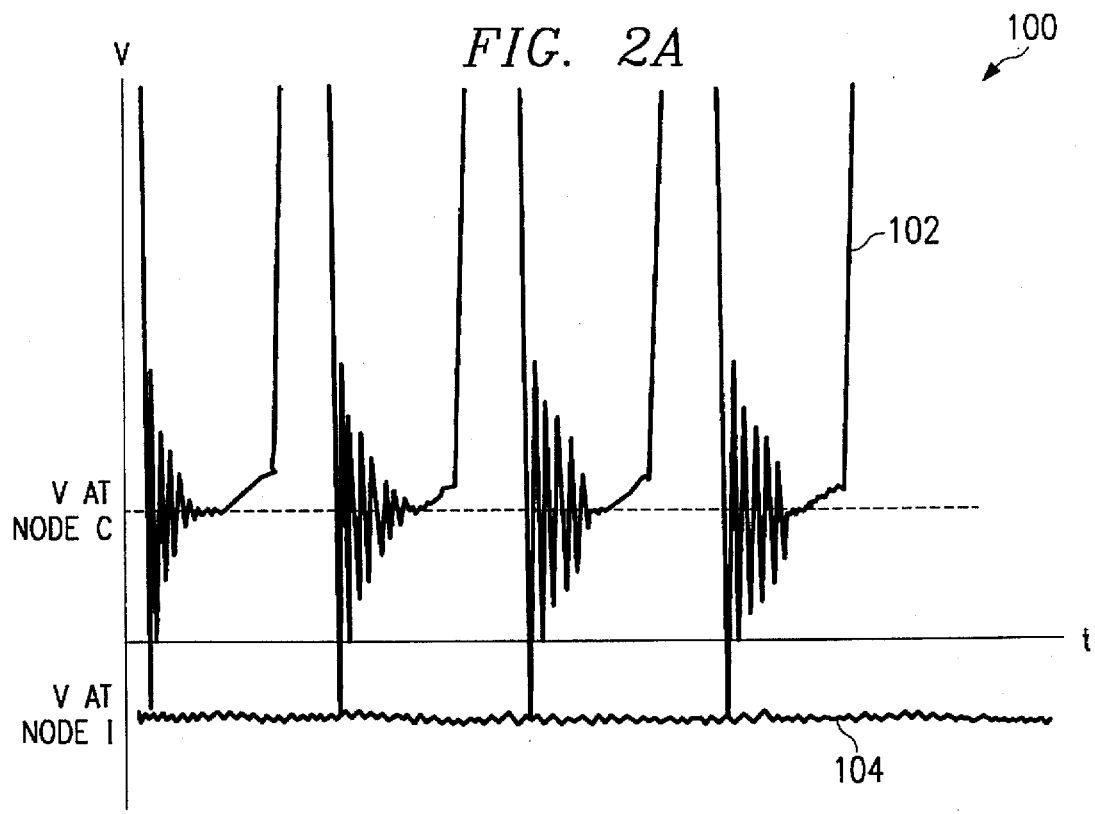
FIGS. 2A and 2B are graphs illustrating exemplary voltage signals appearing at various nodes throughout the circuit shown in FIG. 1.
Figure 2B:
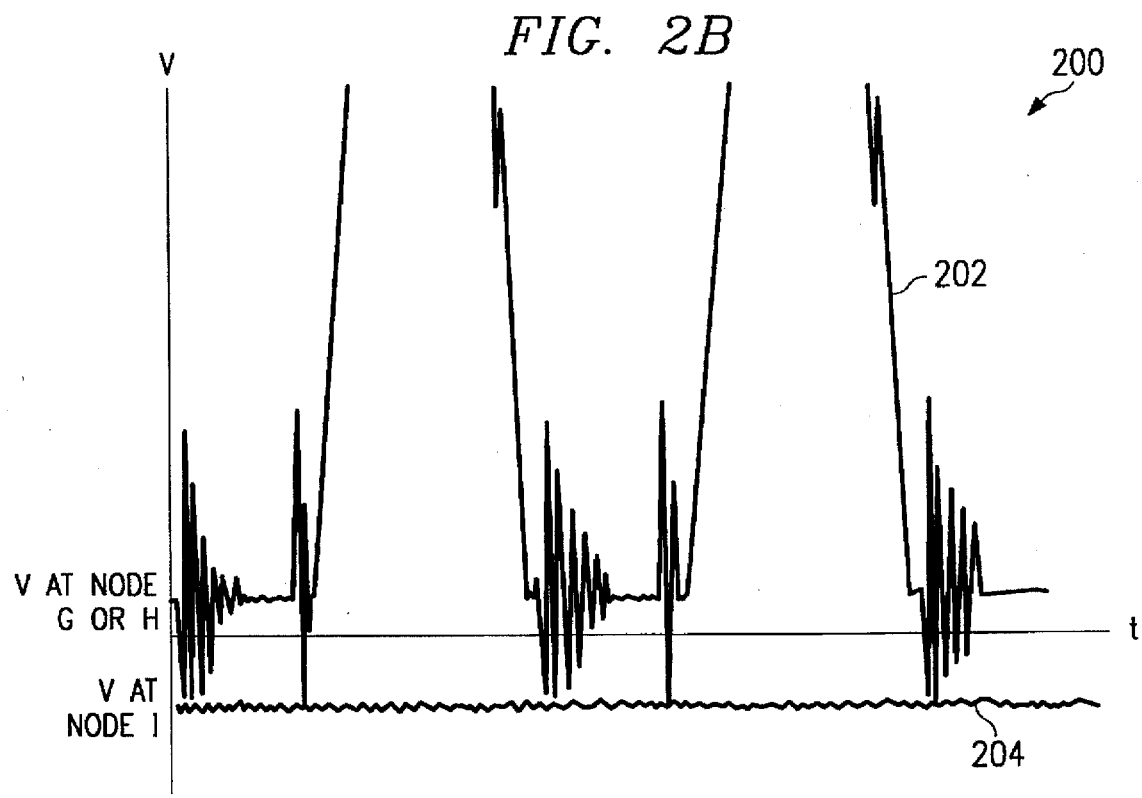

The preferred embodiment of the present invention and its advantages are best understood by referring to FIGS. 1, 2A, and 2B of the drawings, like numerals being used for like and corresponding part of the various drawings.

FIG. 1 illustrates a schematic diagram for an exemplary current-fed DC-to-DC power converter 10 having a transient voltage suppression element 12, according to an embodiment of the present invention. Generally, converter 10 functions to convert voltage within a specific range of magnitudes appearing at $V_{IN}$ into voltage of a predetermined magnitude at $V_{OUT}$. This predetermined voltage magnitude may be 200 volts or more. Converter 10 includes an input capacitor 13, which is connected in parallel with $V_{IN}$. Input capacitor 13 functions to reduce voltage fluctuations on the input caused by current fluctuations that occur as converter 10 operates.

A pulse width modulator (PWM) 14 is also connected in parallel with $V_{IN}$. Pulse width modulator 14 is operable to activate when a voltage in the given magnitude range is applied at $V_{IN}$. Pulse width modulator 14 is further connected to $V_{OUT}$ and functions to compare the voltage at $V_{OUT}$ against a reference voltage. If the magnitudes of the voltage at $V_{OUT}$ and the reference voltage are not the same, pulse width modulator 14 will adjust the duty cycle of two output drive signals.

A switch 16 and a switch 18 are coupled to pulse width modulator 14. Each switch receives one of the drive signals output by pulse width modulator 14. The drive signals, which may have a duty cycle of approximately 50%, function to turn switches 16 and 18 on and off. In one embodiment, switches 16 and 18 each can be implemented as a transistor, such as a MOSFET.

An input choke 20, which is connected to $V_{IN}+$, comprises a primary winding 22 and a secondary winding 24. Input choke 20 functions as a smoothing choke to reduce the amount of current fluctuation in circuit 10. Current may flow through primary winding 22 in the direction of node A to node B if either switch 16 or switch 18 is on. This current flowing through primary winding 22 may establish a charge which causes current to flow through secondary winding 24 in the direction of node D to node C when switch 16 and switch 18 are both off.

A power transformer 26 is coupled to input choke 20 and switches 16 and 18. Power transformer 26 comprises a primary winding 28 and a secondary winding 30. The middle of primary winding 28 of power transformer 26 is coupled at node B to one end of primary winding 22 of input choke 20. Similarly, the middle of secondary winding 30 of power transformer 26 is coupled at node D to an end of secondary winding 24 of the input choke. Switch 16 and switch 18 are coupled to opposing ends of primary winding 28 at node E and node F, respectively. Power transformer 26 is operable to transform electrical energy at one voltage magnitude into electrical energy at another voltage magnitude. Current may flow through primary winding 28 in the direction of node B to node E when switch 16 is on, and in the direction of node B to node F when switch 18 is on. Current may flow through secondary winding 30 in either the direction of node G to node D or the direction of node H to node D, depending on the states of switches 16 and 18, as described below in more detail.

A plurality of output rectifiers 32, 34, and 36, are coupled to the secondary windings of input choke 20 and power transformer 26. In particular, the anode of output rectifier 32 is coupled at node C to one end of secondary winding 24 of input choke 20. The anodes of output rectifiers 34 and 36 are coupled to the opposing ends of secondary winding 30 of power transformer 26 at nodes G and H, respectively. The cathodes of each output rectifier are coupled to $V_{OUT}30$. Each output rectifier functions to pass current in only a forward direction.

The cathodes of a plurality of isolation diodes 38, 40, and 42 are coupled to the anodes of output rectifiers 32, 34, and 36, respectively. The anodes of the isolation diodes 38, 40, and 42 are coupled to the anode of transient voltage suppression element 12. The cathode of transient voltage suppression element 12 is coupled to $V_{OUT}+$. Transient voltage suppression element 12, which can be implemented as a transient voltage suppresser diode or clamp, is operable to prevent the voltage appearing at node I from exceeding a predetermined value. Stated differently, transient voltage suppression element 12 can be a "breakdown" device which allows current to flow in the reverse bias direction at breakdown voltage, thereby "clamping" the voltage. Each of isolation diodes 38, 40, and 42 functions to prevent current from flowing through transient voltage suppression element 12 in the forward direction. In addition, isolation diodes 38, 40, and 42 are operable to isolate the high junction capacitance of transient voltage suppression element 12, thereby isolating nodes C, G, and H from the slow recovery of transient voltage suppression element 12. A capacitor 44 may be coupled in parallel with transient voltage suppression element 12 to further improve performance of the transient voltage suppression element.

An output capacitor 46 is coupled in parallel with $V_{OUT}$. Output capacitor 46 functions to store charge as pulse width modulator 14 cycles to alternately turn switches 16 and 18 on and off, averaging the current pulses from output rectifiers 32, 34, and 36 resulting in a DC voltage at $V_{OUT}$.

In operation, pulse width modulator (PWM) 14 begins to operate when a voltage in the given magnitude range is applied at $V_{IN}$. Pulse width modulator 14 compares the voltage at $V_{OUT}$ against the reference voltage. If the magnitude of the voltage at $V_{OUT}$ is not the same as the magnitude of the reference voltage, pulse width modulator 14 outputs the drive signals which turn switches 16 and 18 on and off. Initially, both switch 16 and switch 18 are off, in which case no current flows through circuit 10.

Switch 16 may then be turned on by one of the drive signals while switch 18 remains off. In this case, current flows through the primary winding 22 of input choke 20 in the direction of node A to node B and through the primary winding 28 of power transformer 26 in the direction of node B to node E. This current establishes a charge in primary winding 22 of input choke 20. The current flowing through the primary windings also causes a corresponding current to flow through secondary winding 30 of power transformer 26 in the direction of node D to node G and through output rectifier 34, thereby charging output capacitor 46. As the corresponding current starts to flow, input choke 20 and power transformer 26 produce voltage transients at nodes C and H, respectively, which are illustrated in FIGS. 2A and 2B. Some of these voltage transients may reverse bias output rectifiers 32 and 36. Transient voltage suppression element 12 and isolation diodes 38 and 42 function to protect these output rectifiers. Transient voltage suppression element 12 "clamps" the magnitude of the voltage at node I to the predetermined value. Current is able to flow through isolation diodes 38 and 42 to "clamp" the voltage transients. Thus, the voltage transients appearing at the anodes of output rectifiers 32 and 36 are prevented from exceeding the predetermined value. Consequently, output rectifiers 32 and 36 are protected.

Next, switch 16 may then be turned off. The effect of the slow recovery of transient voltage suppression element 12 during transitions, for both switches 16 and 18, is isolated by the isolation diodes, which isolate nodes C, G, and H from the high junction capacitance of voltage suppression element 12. The charge previously established in primary winding 22 causes current to flow through secondary winding 24 of input choke 20 in the direction of node D to node C and through output rectifier 32, thereby further charging output capacitor 46.

A drive signal from pulse width modulator 14 may then turn on switch 18 while switch 16 remains off. As a result, current flows through the primary winding 22 of input choke 20 in the direction of node A to node B and through the primary winding 28 of power transformer 26 in the direction of node B to node F. This current causes a corresponding current to flow through secondary winding 30 of power transformer 26 in the direction of node D to node H and through output rectifier 36, thereby continuing to charge output capacitor 46. As the corresponding current starts to flow through the secondary windings, input choke 20 and power transformer 26 produce voltage transients at nodes C and G, respectively, which are illustrated in FIGS. 2A and 2B. Some of these voltage transients may reverse bias output rectifiers 32 and 34. In this case, transient voltage suppression element 12 and isolation diodes 38 and 40 protect output rectifiers 32 and 34 in substantially the same manner as previously described for the case when switch 16 is turned on and switch 18 is off.

Switches 16 and 18 are turned on and off as described above until output capacitor 46 is charged to the predetermined voltage magnitude for $V_{OUT}$. Transient voltage suppression element 12 and isolation diodes 38, 40, and 42 protect output rectifiers 32, 34, and 36 from voltage transients which are produced when either switch 16 or switch 18 turns on. Thus, a single transient voltage suppression element 12 may be used to protect multiple output rectifiers, i.e., rectifiers 32, 34, and 36, in current-fed DC-to-DC converter 10.

FIG. 2A is a graph 100 illustrating an exemplary voltage signal 102 appearing at the anode of output rectifier 32 (node C) and also an exemplary voltage signal 104 appearing at the anode of transient voltage suppression element 12 (node I). Voltage signal 104 results from the "clamping" action of transient voltage suppression element 12, which holds the magnitude of the voltage at node I to a predetermined negative value. Voltage signal 102 comprises a plurality of voltage pulses which are generated at node C by input choke 20 as circuit 10 operates. At least a portion of these voltage pulses correspond to voltage transients that are created when switch 16 or switch 18 turns on. When the voltage transients create a negative bias at node C large enough to forward bias isolation diode 38, current flows from node I to node C. Consequently, the magnitude of the voltage transients creating a negative bias at node C does not exceed the negative voltage appearing at node I. In this manner, transient voltage suppression element 12 and isolation diode 38 protect output rectifier 32.

FIG. 2B is a graph 200 illustrating an exemplary voltage signal 202 appearing at the anode of output rectifier 34 (node G) and an exemplary voltage signal 204 appearing at the anode of transient voltage suppression element 12 (node I). Voltage signal 204 is substantially similar to voltage signal 104 described with reference to FIG. 2A. Like voltage signal 104, voltage signal 204 results from the clamping action of transient voltage suppression element 12 which holds the voltage at node I to a predetermined negative voltage. Voltage signal 202 comprises a plurality of voltage pulses which are generated at node G as circuit 10 operates. Some of the voltage pulses in voltage signal 202 correspond to voltage transients that are created when switch 16 turns on. If the voltage transients create a negative bias at node G large enough to forward bias isolation diode 40, current flows from node I to node G so that the magnitude of the negative voltage transients at node G does not exceed the negative voltage at node I. Thus, transient voltage suppression element 12 and isolation diode 40 protect output rectifier 34.

It should be understood that a voltage signal similar to exemplary signal 202 can appear at the anode of output rectifier 36 (node H). In such case, transient voltage suppression element 12 and isolation diode 42 protect output rectifier 36 in substantially the same manner previously described with reference to FIG. 2B.

Although the present invention and its advantages have been described in detail, it should be understood that various changes, substitutions, and alterations can be made herein without departing from the spirit and scope of the invention as defined by the appended claims.

What is claimed is:

1. A circuit for protecting a plurality of output rectifiers against voltage transients in a current-fed converter, comprising:

a plurality of isolation diodes, each isolation diode coupled to the anode of an output rectifier; and transient voltage suppression means coupled to the isolation diodes, the transient voltage suppression means operable to limit the magnitude of voltage transients in the converter, thereby protecting the plurality of output rectifiers.

2. The circuit of claim 1, wherein the voltage transient suppression means comprises a transient voltage suppresser diode.

3. The circuit of claim 1, wherein the voltage transient suppression means comprises:

a transient voltage suppresser diode; and a capacitor coupled in parallel with the transient voltage suppresser diode.

4. The circuit of claim 1, wherein each isolation diode is operable to isolate the high junction capacitance of the transient voltage suppression means.

5. A transient voltage suppression means for protecting a plurality of output rectifiers in a current-fed DC-to-DC converter, the transient voltage suppression means comprising a transient voltage suppression element coupled to a plurality of isolation diodes, each isolation diode coupled to the anode of a corresponding output rectifier, the transient voltage suppression means operable to limit the magnitude of voltage transients in the converter to a predetermined value.

6. The transient voltage suppression means of claim 5, further comprising a capacitor coupled in parallel with the transient suppression element.

7. The transient voltage suppression means of claim 5, wherein the transient voltage suppression element comprises a transient voltage suppresser diode.

8. A current-fed DC-to-DC converter having a plurality of output rectifiers, the converter comprising:

a first isolation diode coupled to the anode of a first output rectifier;

a second isolation diode coupled to the anode of a second output rectifier; and a transient voltage suppression element coupled to the first isolation diode and the second isolation diode, the transient voltage suppression element operable to limit the magnitude of voltage transients in the converter, thereby preventing damage to the first and second output rectifiers.

9. The converter of claim 8, wherein the transient voltage suppression element comprises a transient voltage suppresser diode.

10. The converter of claim 8, further comprising a capacitor coupled in parallel with the transient voltage suppression element.

11. The converter of claim 8, further comprising:

an input choke coupled to the first output rectifier, the input choke operable to store charge and generate current during operation of the converter; and a power transformer coupled to the second output rectifier, the power transformer operable to transform power.

12. The converter of claim 8, wherein the converter is operable to output a voltage having a magnitude of at least 200 volts.

13. A current-fed DC-to-DC converter having an input choke, a power transformer, and a plurality of output rectifiers, the converter comprising:

a first isolation diode coupled to the anode of a first output rectifier;

a second isolation diode coupled to the anode of a second output rectifier; and a transient voltage suppression element coupled to the first isolation diode and the second isolation diode, the transient voltage suppression element operable to limit the magnitude of voltage transients created by the input choke and the power transformer during operation of the converter, thereby preventing damage to the first and second output rectifiers.

14. A current-fed DC-to-DC converter comprising:

an input choke operable to reduce current fluctuation in the converter;

a power transformer coupled to the input choke, the power transformer operable to transform electrical energy at one voltage magnitude into electrical energy at another voltage magnitude;

a first output rectifier coupled to the input choke;

a first isolation diode coupled to the anode of the first output rectifier;

a second output rectifier coupled to the power transformer;

a second isolation diode coupled to the anode of the second output rectifier; and a transient voltage suppression element coupled to the first isolation diode and the second isolation diode, the transient voltage suppression element operable to limit the magnitude of voltage transients created by the input choke and the power transformer during operation of the converter, thereby preventing damage to the first and second output rectifiers.

15. The converter of claim 14, wherein the transient voltage suppression element comprises a transient voltage suppresser diode.

16. The converter of claim 14, further comprising a capacitor coupled in parallel with the transient voltage suppression element.

17. The converter of claim 14, further comprising a pulse width modulator coupled to the power transformer, the pulse width modulator operable to output a plurality of drive signals.

18. The converter of claim 14, further comprising:

a pulse width modulator operable to output a plurality of drive signals;

a first switch connected to the pulse width modulator and the power transformer, the first switch operable to receive a first drive signal; and a second switch connected to the pulse width modulator and the power transformer, the second switch operable to receive a second drive signal.

\* \* \* \* \*

UNITED STATES PATENT AND TRADEMARK OFFICE
CERTIFICATE OF CORRECTION

PATENT NO. : 5,673,186
DATED : September 30, 1997
INVENTOR(S) : *Johnson*

It is certified that error appears in the above-identified patent and that said Letters Patent is hereby corrected as shown below:

On the title page item [54], and column 1, line 3, delete "DC-TO DC" and insert -- DC-TO-DC --.

Signed and Sealed this

Ninth Day of December, 1997

Attest:

BRUCE LEHMAN

Attesting Officer

Commissioner of Patents and Trademarks